United States Patent [19]

Chang

[11] 4,359,610
[45] Nov. 16, 1982

[54] TELEPHONE RINGING CIRCUIT

[76] Inventor: Pan W. Chang, 2, La. 2, Yi Min St., Miau Li Chung, Kiau Li Hsien, Taiwan

[21] Appl. No.: 158,164

[22] Filed: Jun. 10, 1980

Related U.S. Application Data

[63] Continuation-in-part of Ser. No. 974,432, Dec. 29, 1978, abandoned.

[51] Int. Cl.³ .............................................. H04M 1/00
[52] U.S. Cl. .................................................. 179/84 T
[58] Field of Search ................ 179/84 R, 84 L, 84 T, 179/81 R; 340/384 E

[56] References Cited

U.S. PATENT DOCUMENTS 3,218,395  11/1965  Suda .................. 179/84 T
3,466,403   9/1969  Combridge ............ 179/84 T

FOREIGN PATENT DOCUMENTS 678522  1/1964  Canada .............................. 179/84 T

*Primary Examiner*—Joseph A. Popek
*Attorney, Agent, or Firm*—Abelman, Frayne & Rezac

[57] ABSTRACT

An improved telephone ringing circuit in which a ringing circuit is connected with a triac to allow an entry of ringing signals which are rectified by a full-wave rectifier connected in series with the triac. The D.C. voltage is being supplied to a sound producing device such as an oscillation circuit coupled with a speaker. The ringing circuit is also provided with a variable resistor for adjusting the D.C. voltage and a variable resistor in the oscillation circuit for adjusting the frequency of the A.C. output signals delivered by the oscillation circuit to the speaker.

4 Claims, 3 Drawing Figures

TELEPHONE RINGING CIRCUIT

CROSS-REFERENCE TO RELATED APPLICATION

The present application is a Continuation-in-Part of copending Ser. No. 974,432, filed Dec. 29, 1978, by the application herein, now abandoned.

BACKGROUND OF THE INVENTION

Many types of telephone sets are currently available in the market; however, their ringing circuits are nearly the same. When a conventional telephone is ringing, its sound is very loud and noisy. When several sets of conventional telephones are closely installed, it is hard to distinguish which one is ringing as each one rings the same identical way. Furthermore, the conventional telephone sets produce undesirable sounds because of the transient oscillating current generated by the consecutive opening and closing of the contacts in the telephone sets when dialing the telephone. Another disadvantage of conventional telephone sets is that the modification of the ringing circuit in order to change the level or tone of the ringing sounds is not easy; for example, the circuit disclosed in U.S. Pat. No. 3,135,896 entitled "Narrow Band Sensing Circuit" operates only with a ringing signal of 25 cycles/sec.

SUMMARY OF THE INVENTION

The present invention discloses an improved telephone ringing circuit in which a ringing circuit is connected with a triac to allow an entry of ringing signals which are rectified by a full wave rectifier connected in series with the triac. The D.C. voltage is being supplied to a sound producing device such as an oscillation circuit coupled with a speaker. The ringing circuit is also provided with a variable resistor for adjusting the D.C. voltage and a variable resistor in the oscillation circuit for adjusting the frequency of the A.C. output signals delivered by the oscillation circuit to the speaker.

It is an object of the this invention to provide an improved ringing circuit for telephones capable of generating a pleasant ringing sound.

It is another object of this invention to provide an improved ringing circuit for telephone operable with ringing frequencies in a wide frequency range.

DETAILED DESCRIPTION OF THE INVENTION

Figure 1:
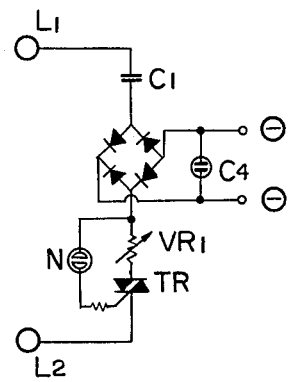
FIG. 1 is a basic circuit diagram of a telephone ringing circuit of the present invention.

In FIG. 1, $L_1$ and $L_2$ designate the input terminals through which the A.C. input signals, i.e., the ringing signals from the other telephones, are provided to the basic circuit of this invention.

As shown in FIG. 1, the basic circuit of this invention comprises a capacitor $C_1$ with its one terminal connected to the input terminal $L_1$ and with its other terminal connected to one of the two A.C. input terminals of a full-wave rectifier. A variable resistor VR1, with its one end connected to the second A.C. input terminal of said full-wave rectifier and with its other end connected to the anode of a triac, TR, a neon lamp N with its one terminal connected to the junction of the second A.C. input terminal of the full-wave rectifier and the variable resistor VR1, and with its other terminal connected to the gate of the triac TR, so that the neon lamp is in parallel connection with the series-connected variable resistor $VR_1$ and the triac. The cathode of the triac is connected to the input terminal $L_2$. Two D.C. output terminals $\ominus$ and $\oplus$ of the full-wave rectifier are shunted by a capacitor $C_4$. The neon lamp N is of such type that its specific firing voltage is lower than the voltage of the input ringing signal. More specifically, the specific firing voltage of the neon lamp is 75 V while the voltage of the input ringing signal is 85 V.

When an A.C. ringing signal is supplied to the input terminals $L_1$ and $L_2$ as when the telephone is being called from the outside, the capacitor $C_1$ allows the A.C. ringing signal to apply directly on the neon lamp and to light it. As soon as the neon lamp is lit to become conducting, the anode voltage of the triac is applied to its cathode through the neon lamp, in other words, the triac is "triggered" to become conducting thus taking over the function of the neon lamp, enabling the rectifier to deliver a D.C. output voltage which is selectively adjustable by the variable resistor $VR_1$.

The circuit described above is operable only when the voltage of the input signals applied across the input terminals $L_1$ and $L_2$ is higher than the specific firing voltage of the neon lamp. With this arrangement, the undesirable, interferring input signals created and fed from the dialing circuit, not shown, when dialing, will be blocked as the voltage of these signals is usually about 40 V, which is lower than the specific firing voltage of the neon lamp. The use of a triac renders less power consumption. It is adapted to take over the function of the neon lamp as soon as the triac is triggered, and the triac consumes less power than the neon lamp.

Figure 2:
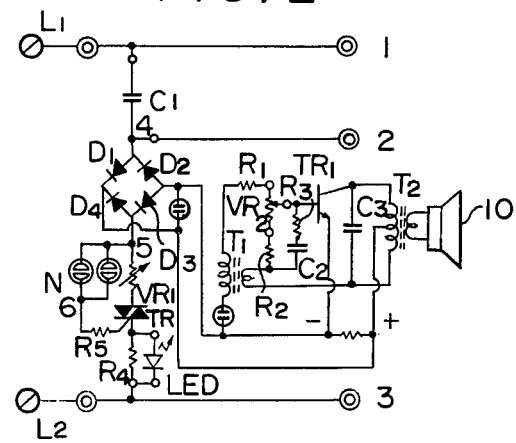
FIG. 2 is a circuit diagram embodying the present invention in association with an oscillation circuit and a speaker.

FIG. 2 shows an embodiment of the improved ringing system of telephone in which the basic circuit as shown in FIG. 1 is employed. This embodiment primarily comprises four members, namely, a full-wave rectifier, a triac detecting circuit, an indicating LED circuit and an oscillating circuit with a variable resistor for selectively adjusting the oscillation frequency. The triac detecting circuit comprises a triac with its gate connected with a resistor $R_5$ to a common terminal 6 of two glow lamps (or fluorescent glow indicator lamps) which are connected in parallel. The addition of one neon lamp as compared with the basic circuit shown in FIG. 1 provides assurance of the functional life of the neon lamp. The other common terminal 5 of aforesaid neon lamps is connected to one of the two A.C. input terminals of the full-wave rectifier. The common terminal 5 of the aforesaid neon lamps is also connected to the anode of the triac TR through a variable resistor $VR_1$ in series with the triac, said variable resistor $VR_1$ being adapted for selectively adjusting the voltage of the D.C. output to the oscillating circuit form the fullwage rectifier. The indicating LED circuit comprises a LED and a resistor $R_4$ connected in parallel therewith, and is adapted to connect the cathode of the triac and the input terminal $L_2$. The full-wave rectifier is of fourdiode bridge type having one of its two A.C. input terminals connected to the junction 5 as described above, and its other A.C. input terminal connected to a capacitor $C_1$ whose other terminal is connected to another input terminal $L_1$ as in the basic circuit shown in FIG. 1. The two D.C. output terminals of the full-wave rectifier are connected to the oscillation circuit comprising a transformer $T_1$, a transistor $TR_1$, capacitors $C_2$ and $C_3$, resistors $R_1$, $R_2$ and $R_3$, and a variable resistor $VR_2$ arranged as shown in FIG. 2.

Connecting terminals 1, 2 and 3 are provided as shown in FIG. 2 for connection with other circuits in the telephone set including that for the telephone transmitter and the receiver (not shown in the drawing).

The ringing signals from the outside are fed across the input terminals $L_1$ and $L_2$. The signals are rectified and fed to the oscillation circuit as described above, the oscillation circuit then drives the speaker 10 to produce intermittent chirp-like sounds instead of the conventional bell-ringing sounds.

When the receiver of a telephone set is picked up, its hook contacts in the telephone set are closed to enable the operation of the telephone communication. However, the closing of the hook contacts also permits the feedback of interferring signals created by transient voltage generated by the consecutive closing and opening of electrical contacts in the telephone sets through connecting terminals 1, 2 and 3 when dialing. Such signals are usually in the range of 20 V to 40 V A.C. and they will be received by the ringing circuit in the case of conventional telephones. Therefore, as described above, these interferring signals will be blocked by the triac detecting circuit according to this invention, and no intereferring sounds will be allowed to produce by the speaker 10.

The variable resistor $VR_2$ permits a selective adjusting of the oscillation frequency, thus, changing the frequency and quality of the calling sound.

It is apparent from the foregoing description that since the triac detecting circuit having neon lamps prevents undesirable, interferring input signals from entering into the ringing circuit. The use of triac in parallel with neon lamps reduces the energy loss, and the variable resistor $VR_1$ makes adjustment of the level of ringing sound possible. The variable resistor $VR_2$ provides a choice of oscillation frequencies modifying the quality of the ringing sound, and the ringing circuit according to the present invention provides many advantageous features over the conventional system in being capable of selectively adjusting the level and quality of the ringing sounds of a telephone set.

Figure 3:
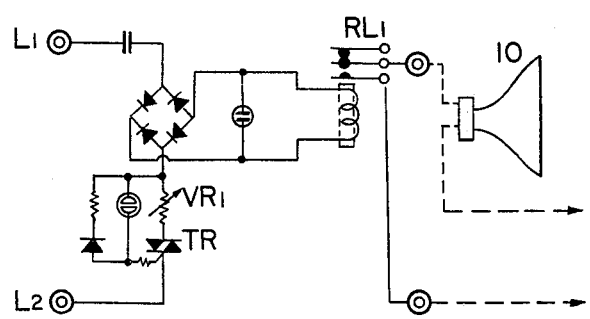
FIG. 3 is a circuit diagram embodying the present invention in which a relay circuit is employed for actuating a sound producing device in a remote distance.

FIG. 3 shows another embodiment of the present invention, in which a relay $RL_1$ is provided to be energized by the D.C. output voltage from the full-wave rectifier for actuating the relay contacts which turn on and off a sound producing device (not shown) in a remote distance. This embodiment illustrates an application of the basic circuit of this invention for remote control purposes such as in a large factory.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

What is claimed is:

1. An improved ringing circuit for telephone sets, comprising:
   (a) a pair of input terminals having a first input terminal and a second input terminal for receiving A.C. ringing signals from the telephone set;
   (b) a full-wave rectifier having first and second input terminals, and first and second output terminals;
   (c) a capacitor connected in between the first input terminal for receiving A.C. ringing signals and the first input terminal of the full-wave rectifier;
   (d) a triac having an anode, a gate and a cathode, said cathode being connected to the second input terminal for receiving A.C. ringing signals;
   (e) a variable resistor having first and second ends, the first end being connected to the second input terminal of the full-wave rectifier and the second end being connected to the anode of said triac;
   (f) a neon lamp connected across the gate of said triac and the second input terminal of the full-wave rectifier, said neon lamp having a predetermined firing voltage lower than the voltage of the A.C. ringing signals; said neon lamp being arranged to trigger said triac for activating said rectifier to deliver a D.C. output;
   (g) a capacitor connected in parallel across the first and second output terminals of the full-wave rectifier;
   (h) a sound producing circuit for producing a sound in accordance with said D.C. output delivered by said full-wave rectifier.

2. An improved ringing circuit for telephone sets as recited in claim 1, in which said sound producing circuit is connected across said first and second output terminals of said full-wave rectifier, and comprises: an oscillating circuit and a speaker, and a variable resistor for selective adjustment of the frequency and quality of the sound produced by said sound producing circuit.

3. An improved ringing circuit for telephone sets as recited in claim 1 and further including an LED circuit connected between the cathode of said triac and the second input terminal for A.C. ringing signals for providing a visual indication of received ringing signals.

4. An improved ringing circuit for telephone sets as recited in claim 1, wherein said full-wave rectifier is provided with a relay connected across said first and second output terminals of said full-wave rectifier, said relay being adapted to be energized by said D.C. output of said full-wave rectifier to activate said sound producing circuit.

* * * * *